J. Murphy,
Rattan Cutter.

No. 104,338. Patented June 14, 1870.

Witnesses:
Alex. F. Roberts
S. S. Mabee

Inventor:
J. Murphy
per Munn & Co.
Attorneys.

United States Patent Office.

JOHN MURPHY, OF GREEN POINT, NEW YORK, ASSIGNOR TO HIMSELF AND JOSEPH F. TOBIN, OF NEW YORK CITY.

Letters Patent No. 104,338, dated June 14, 1870.

IMPROVEMENT IN RATTAN-CUTTER.

The Schedule referred to in these Letters Patent and making part of the same.

*To all whom it may concern:*

Be it known that I, JOHN MURPHY, of Green Point, in the county of Kings and State of New York, have invented a new and improved Rattan-cutter for Umbrella-Ribs; and I do hereby declare that the following is a full, clear, and exact description thereof, which will enable others skilled in the art to make and use the same, reference being had to the accompanying drawing forming part of this specification, in which—

Similar letters of reference indicate corresponding parts.

This invention has for its object to construct a tool by means of which rattan can be cut on three sides for umbrella-ribs, and the outer separated parts split, to be useful for caning chairs.

The invention consists of a cutter constructed as hereinafter described.

The rattan umbrella-ribs have to be left unpared on one side to retain the requisite strength, and the ordinary continuous cutters are therefore not applicable.

Figure 1:
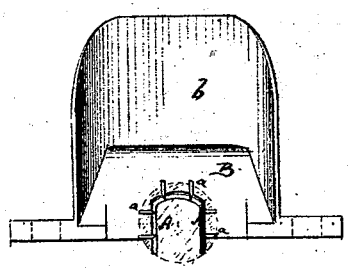
Figure 1 represents a front view of my improved rattan-cutter.
Figure 2:
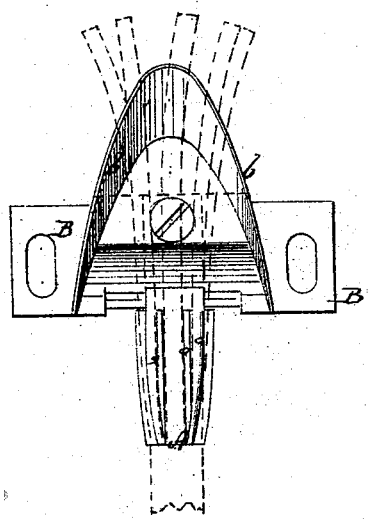
Figure 2 is a plan or top view of the same.

My cutter A is three-sided, as shown in fig. 1, and open on one side, so that three sides of each cane will be peeled, and the fourth left in the natural state.

From the outer faces of the cutter project ribs $a$ $a$, with sharpened front ends, which serve to split the peeled shell of the rattan into narrow strips for caning chairs. The ribs $a$ are disposed at suitable distances apart.

The cutter is affixed to a plate, B, which has a projecting plow-shaped flange, $b$, on which the split strips are guided together.

The machinery for feeding the rattan may be of suitable construction. A guide-piece may be placed under the open side of the cutter, to support the rattan while the same passes through the said cutter.

Having thus described my invention,

What I claim as new, and desire to secure by Letters Patent, is—

The cutter A, provided with the cutting-ribs $a$, constructed as shown and described.

JOHN MURPHY.

Witnesses:
  GEO. W. MABEE,
  ALEX. F. ROBERTS.